Jan. 30, 1934.  W. L. PEARCE  1,945,160

DRILL

Filed Feb. 13, 1933

Inventor
William L. Pearce

By Hardway Rathey
Attorneys

Patented Jan. 30, 1934

1,945,160

UNITED STATES PATENT OFFICE 1,945,160

DRILL

William L. Pearce, Houston, Tex.

Application February 13, 1933. Serial No. 656,599

4 Claims. (Cl. 255—61)

This invention relates to a drill.

An object of the invention is to provide a drill of the character described specially designed for use in drilling deep wells, such as oil wells, and which is provided with novel channels for supplying the drilling fluid to the cutters at the lower end of the drill.

Another object of the invention is to provide a drill having channels for said drilling fluid which are gradually flared downwardly to the end that any clogging material that may become lodged in the channels may be readily dislodged by the pressure of the drilling fluid so that said channels will not become plugged and closed by the cuttings.

Another object of the invention resides in the provision of a novel construction whereby the channels for the drilling fluid are formed.

With the above and other objects in view the invention has particular relation to certain novel features of construction, arrangement of parts and use an example of which is given in this specification and illustrated in the accompanying drawing wherein:—

Figure 1:
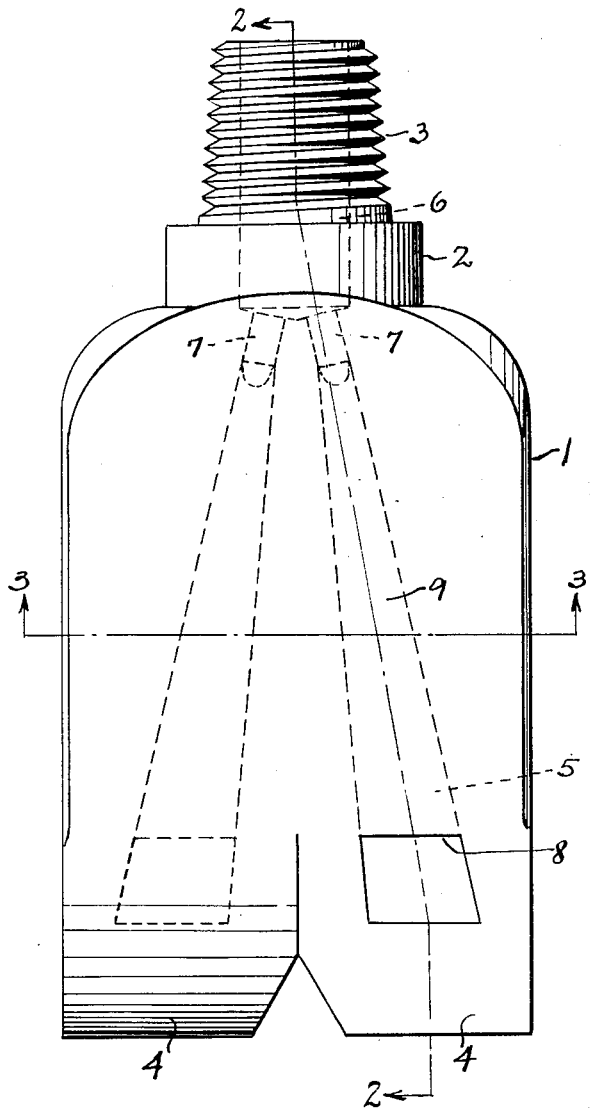
Figure 1 shows an elevational view of the drill embodying the invention.
Figure 2:
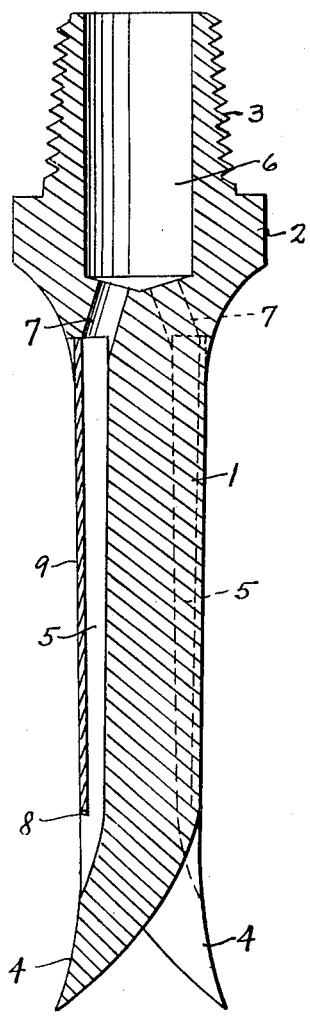
Figure 2 shows a vertical sectional view taken on the line 2—2 of Figure 1.
Figure 3:
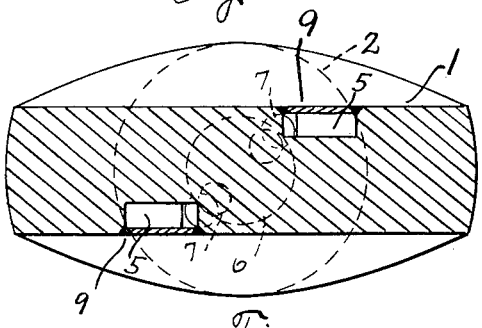
Figure 3 shows a transverse sectional view taken on the line 3—3 of Figure 1.

Referring now more particularly to the drawing wherein like numerals of reference designate similar parts in each of the figures, the numeral 1 designates the body of the drill whose upper end is formed with the cylindrical portion forming a head 2 having the upwardly extending outwardly threaded shank 3 providing means for attaching the drill to the drill stem or other operating rod. Beneath the head 2, the body is widened and flattened and is elongated presenting an approximately rectangular contour. At its lower end the body is formed into the oppositely pitched blades or cutting members 4, 4. On each side of the body there is a channel 5 leading from the upper end of the body beneath the cylindrical portion 2 downwardly and terminating at the forward face of the corresponding cutter 4.

The upper end of the drill has an enlarged axial bore 6 leading downwardly through the shank and cylindrical portion 2 and leading from the lower end of this bore into the upper ends of the channels 5, are the passageways 7 for the drilling fluid.

The channels 5 are gradually widened or flared from their upper ends downwardly to the end that the drilling fluid, as it issues from the discharge openings 8 at the lower ends of the channels, will be spread out over the forward faces of the blades 4 to flush off the said blades and remove the formation that might otherwise have a tendency to adhere thereto.

In drilling the material drilled from the bore is sometimes forced up into said channels 5 but the upwardly converging walls will have a tendency to prevent said clogging material from entering the channels any considerable distance and in case said channels should become plugged up with said material the pressure of the drilling fluid will readily remove said clogging material on account of the downwardly enlarging shape of said channels.

A preferred form of the construction of the drill is illustrated. In manufacture the channels 5 are formed by grooving the sides of the body from the lower ends of the passageways 7 down to the forward faces of the blades 4 and these grooves are then covered except at their lower ends by the plates 9 which may be welded in place to provide the inclosed channels 5, said plates 9, when welded in place, having their outer sides approximately flush with the corresponding sides of the drill body.

The drawing and description disclose what is now considered to be a preferred form of the invention by way of illustration only while the broad principle of the invention will be defined by the appended claims.

What I claim is:

1. A drill comprising a body whose upper end is formed for attachment to a drill stem and whose lower end has oppositely directed cutting blades, said drill having longitudinal passageways which terminate on the forward faces of the blades and are downwardly flared throughout their length.

2. A drill comprising a body whose upper end is formed for the attachment of a drill stem thereto and whose lower end has cutters, said drill having longitudinal passages for drilling fluid which are flared laterally and downwardly approximately from their upper to their lower ends and whose lower ends terminate adjacent said cutters.

3. A drill comprising a flat body whose upper end is formed for the attachment of a driving member thereto and whose lower end has oppositely directed cutters, said drill having longitudinal water channels through the body which are downwardly flared from their upper to their lower ends and whose lower ends terminate at the forward sides of said cutters.

4. A drill comprising a head formed with means for the attachment of a drill stem thereto, said drill being widened and formed with a flat body beneath the head, oppositely directed cutters at the lower end of the body, said body having a groove on each side extending from the head downwardly and terminating at the forward sides of the respective cutters, said grooves being gradually widened from their upper to their lower ends, plates secured on opposite sides of the body and covering said grooves throughout their length except at their lower ends, the outer surfaces of the plates being approximately flush with the outer surfaces of the body.

WILLIAM L. PEARCE.